US012006653B2

(12) United States Patent
Yamashita et al.

(10) Patent No.: US 12,006,653 B2
(45) Date of Patent: Jun. 11, 2024

(54) ATTACHMENT FOR WORK MACHINE

(71) Applicant: KOBELCO CONSTRUCTION MACHINERY CO., LTD., Hiroshima (JP)

(72) Inventors: Shinji Yamashita, Hiroshima (JP); Ichiro Wada, Hiroshima (JP); Tsuguhito Fujita, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 737 days.

(21) Appl. No.: 17/252,953

(22) PCT Filed: Jun. 12, 2019

(86) PCT No.: PCT/JP2019/023292
§ 371 (c)(1),
(2) Date: Dec. 16, 2020

(87) PCT Pub. No.: WO2020/012858
PCT Pub. Date: Jan. 16, 2020

(65) Prior Publication Data

US 2021/0189684 A1 Jun. 24, 2021

(30) Foreign Application Priority Data

Jul. 12, 2018 (JP) ................................ 2018-132723

(51) Int. Cl.
*B66C 23/64* (2006.01)
*E02F 3/36* (2006.01)

(52) U.S. Cl.
CPC .............. *E02F 3/369* (2013.01); *B66C 23/64* (2013.01); *Y10T 403/59* (2015.01)

(58) Field of Classification Search
CPC .......... B66C 23/64; B66C 23/70; E02F 3/369; E02F 3/38; Y10T 403/59
See application file for complete search history.

(56) References Cited

U.S. PATENT DOCUMENTS 6,659,708 B2 * 12/2003 Heiple .................. E02F 3/3618 403/321
7,014,385 B2 * 3/2006 Lim ...................... E02F 3/3618 403/324
2003/0074811 A1 4/2003 Sprinkle et al.

FOREIGN PATENT DOCUMENTS

DE 10 2014 009 908 B3 9/2015
EP 2 130 976 A2 12/2009
(Continued)

OTHER PUBLICATIONS

International Search Report dated Jul. 16, 2019 in PCT/JP2019/023292 filed on Jun. 12, 2019, citing documents AA and AP-AT therein, 2 pages.
(Continued)

*Primary Examiner* — Michael P Ferguson
(74) *Attorney, Agent, or Firm* — Oblon, McClelland, Maier & Neustadt, L.L.P.

(57) ABSTRACT

An attachment of a work machine includes first and second attachment bodies connectable to each other quickly and easily. The first attachment body includes first side plates including first projecting portions formed with notches, and the second attachment body includes second side plates including second projecting portions and a fitting pin inserted through the second projecting portions. The interval between the first side plates is larger than the interval between the second side plates. The first and second attachment bodies are interconnected while the first projecting portions are disposed outside the second projecting portions,
(Continued)

and the parts of the fitting pin protruding outward beyond the second projecting portions are fitted with the notches.

4 Claims, 15 Drawing Sheets

(56) References Cited

FOREIGN PATENT DOCUMENTS

| | | | |
|---|---|---|---|
| JP | 11-193542 | A | 7/1999 |
| JP | 2013-23905 | A | 2/2013 |
| JP | 2013-96171 | A | 5/2013 |
| JP | 2015-227611 | A | 12/2015 |
| JP | 2018-21434 | A | 2/2018 |
| JP | 2018-40155 | A | 3/2018 |
| WO | WO 97/33049 | A1 | 9/1997 |

OTHER PUBLICATIONS

Extended European Search Report dated Jun. 30, 2021 in European Patent Application No. 19834123.2 citing documents AO through AQ therein, 8 pages.

* cited by examiner

ATTACHMENT FOR WORK MACHINE

TECHNICAL FIELD

The present invention relates to an attachment of a work machine, the attachment being capable of being assembled with reduced effort.

BACKGROUND ART

There is conventionally known an attachment of work machine, including a first attachment body having a pair of sidewalls and a second attachment body that can be coupled to the pair of sidewalls.

For example, FIGS. 7 and 8 of Patent Document 1 disclose a first insert boom and a second insert boom that are coupled to each other to constitute an attachment. The first insert boom has a pair of side walls and a fixing pin, which is fixed to rear ends of the pair of side walls. The second insert boom also has a pair of side walls, which are formed with a pair of notches, respectively. In a state where the opposite ends of the fixing pin and the pair of notches of the second insert boom are fitted with each other, the first insert boom and the second insert boom are coupled to each other (see FIG. 10 of Patent Document 1). This reduces labor for a subsequent work such as removing and inserting a pin.

However, it is difficult to visually recognize the fitting state between the fixing pin and the notch from the side because, as shown in FIG. 8 of Patent Document 1, the notches of the pair of side walls of the second insert boom are fitted with the fixing pin at respective positions on respective widthwise inner sides of the pair of side walls of the first insert boom. This hinders rapid engagement of the notch with the securing pin (24) and further quick connection of the first and second insert booms with each other.

CITATION LIST

Patent Document

Patent Document 1: Japanese Unexamined Patent Publication No. 2015-227611

SUMMARY OF INVENTION

It is an object of the present invention to provide an attachment for a work machine, the attachment including a first attachment body and a second attachment body that can be detachably coupled to each other and allowing the first and second attachment bodies to be quickly and easily coupled to each other.

Provided is an attachment for a work machine comprising a first attachment body having a first connection end and a second attachment body having a second connection end connectable to the first connection end. The first attachment body includes a first left side plate and a first right side plate arranged left and right, and a first connection plate interconnecting the first left side plate and the first right side plate in the first connection end. The first left side plate has a first left projecting portion that projects beyond the first connection plate toward the second connection end, and the first right side plate has a second right projecting portion that projects beyond the first connection plate toward the second connection end. The second attachment body includes a second left side plate and a second right side plate arranged left and right, a second connection plate interconnecting the second left side plate and the second right side plate in the second connection end, and a fitting pin extending in the left-right direction. The second left side plate includes a second left projecting portion that projects the second connection plate toward the first connection end, and the second right side plate includes a second right projecting portion that projects the second connection plate toward the first connection end. The second left projecting portion is formed with a left fitting pin insertion hole penetrating the second left projecting portion in the left-right direction, and the second right projecting portion is formed with a right fitting pin insertion hole penetrating the second right projecting portion in the left-right direction. The fitting pin is inserted through the left fitting pin insertion hole and the right insertion hole so as to have a left protruding portion protruding to the left outside of the first left projecting portion and a right protruding portion protruding to the right outside of the first right projecting portion. The first left projecting portion is formed with a left notch having a shape opened so as to be able to receive the left protruding portion of the fitting pin radially of the fitting pin, and the first right projecting portion is formed with a right notch having a shape opened so as to be able to receive the right protruding portion of the fitting pin radially of the fitting pin. The interval between the first left side plate and the first right side plate in the left-right direction is greater than the interval between the second left side plate and the second right side plate in the left-right direction. The first attachment body and the second attachment body are configured to be connected to each other in a state where the first left projecting portion and the second right projecting portion are disposed on both outer sides of the second left projecting portion and the second right projecting portion in the left-right direction, and the left projecting portion and the right protruding portion of the fitting pin are configured to be fitted with the left notch and the right notch, respectively, at respective positions on both outer sides of the second left projecting portion and the second right projecting portion in the left-right direction.

DESCRIPTION OF EMBODIMENTS

There will be described an attachment of a work machine according to a first embodiment of the present invention with reference to FIGS. 1 to 8. The attachment according to this embodiment includes a main boom 1 and an insert boom 2 shown in FIG. 1. The main boom 1 is an example of a first attachment body, and the insert boom 2 is an example of a second attachment body. In addition to the main boom 1 and the insert boom 2, the attachment according to this embodiment can include other components such as a known arm and a bucket, but description of the other components is omitted.

Figure 1:
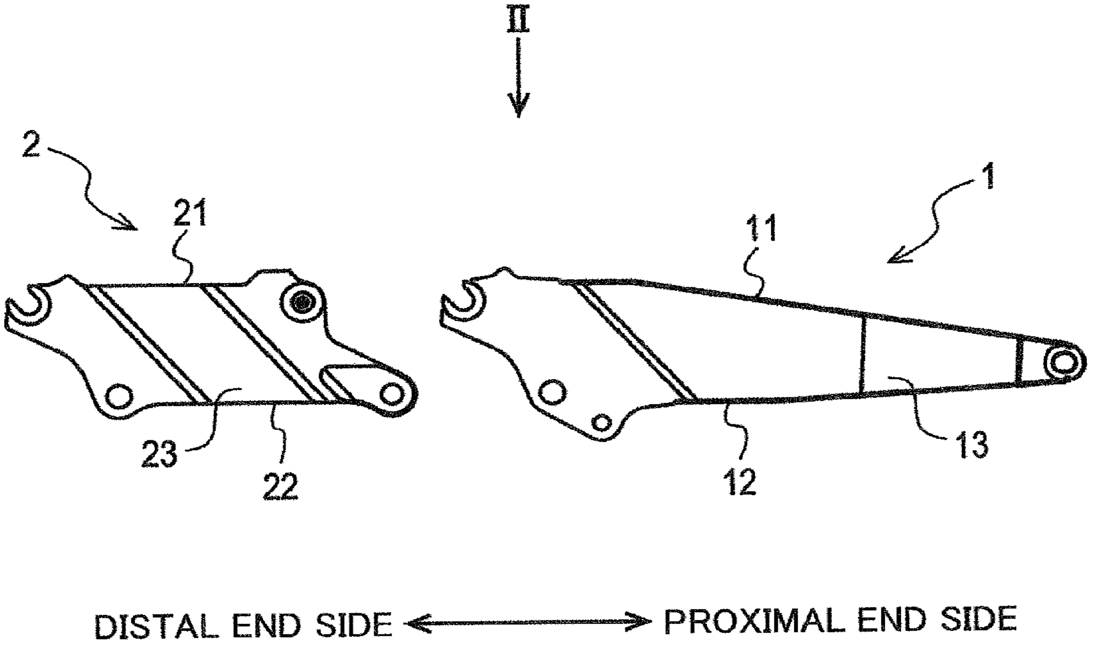
FIG. 1 is a side view showing a main boom and an insert boom constituting an attachment of a work machine according to a first embodiment of the present invention.

The work of assembling the attachment includes a connection work of connecting the main boom 1 and the insert boom 2 to each other. As shown in FIG. 1, in the connection work, the main boom 1 is disposed on the side closer to the proximal end of the attachment than the insert boom 2 (the side close to the machine body of the working machine). In other words, the insert boom 2 is disposed on the side closer to the tip of the attachment than the main boom 1 (far side from the machine body of the working machine). The distal end of the main boom 1 is a first connection end connectable to the insert boom 2, and the proximal end of the insert boom 2 is a second connection end connectable to the first connection end of the main boom 1.

Figure 2:
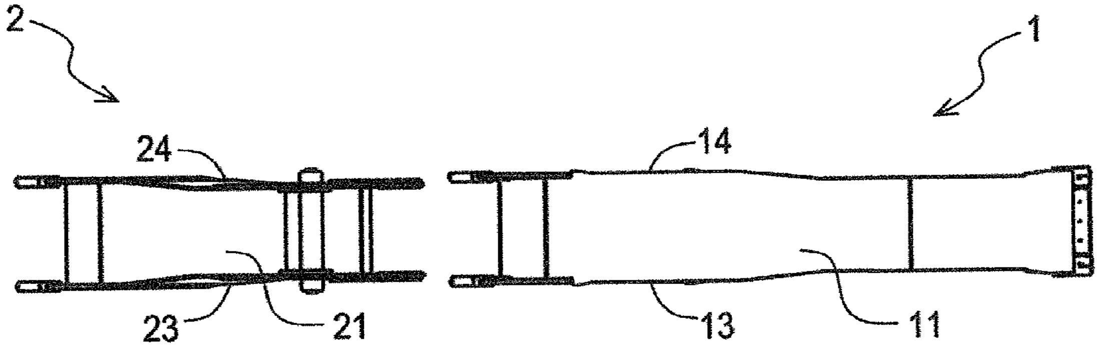
FIG. 2 is a plan view of the main boom and the insert boom viewed in the direction of arrow II in FIG. 1.

As shown in FIG. 1 and FIG. 2, the main boom 1 includes a first upper plate 11 and a first lower plate 12 which are arranged up and down, and a first left side plate 13 and a first right side plate 14 which are arranged left and right.

The first upper plate 11 and the first lower plate 12 are disposed at positions spaced vertically. The first left side plate 13 interconnects the left end of the first upper plate 11 and the left end of the first lower plate 12 vertically. Specifically, the first left side plate 13 has an upper end joined to the left end of the first upper plate 11 and a lower end joined to the left end of the first lower plate 12. The first right side plate 14 interconnects the right end of the first upper plate 11 and the right end of the first lower plate 12 vertically. Specifically, the first right side plate 14 has an upper end joined to the right end of the first upper plate 11 and a lower end joined to the right end of the first lower plate 12. Hereinafter, the first left side plate 13 and the first right side plate 14 are collectively referred to as first left and right side plates 13 and 14. The first left and right side plates 13, 14 are arranged so as to be substantially parallel to each other.

Figure 3:
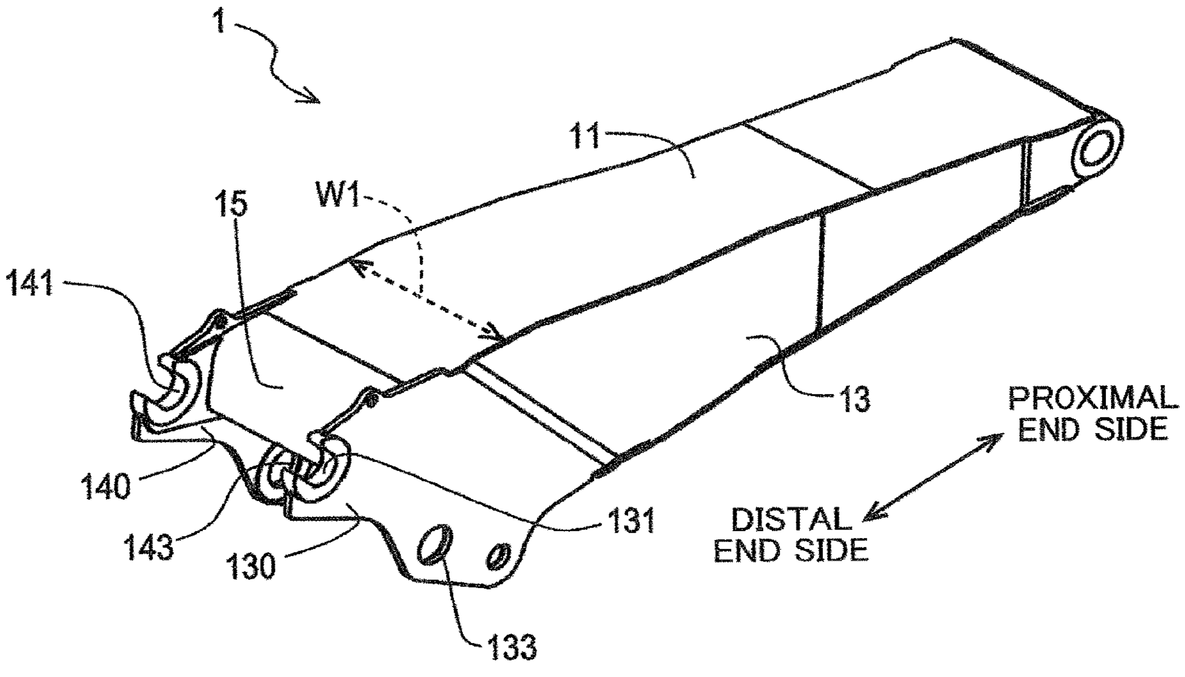
FIG. 3 is a perspective view showing the main boom.

The main boom 1 further includes a first connection plate 15 shown in FIG. 3. The first connection plate 15 is included in a first connection end of the main boom 1. The first connection end is a distal end to be connected to the insert boom 2, the distal end being one of opposite ends of the main boom 1 in the longitudinal direction, i.e., a connection direction in which the main boom 1 and the insert boom 2 are connected to each other. In the first connection end, the first connection plate 15 interconnects the first left side plate 13 and the first right side plate 14 in the left-right direction (width direction). Preferably, the first connection plate 15 further interconnects the first upper plate 11 and the first lower plate 12 vertically.

The first left side plate 13 has a first left projecting portion 130. The first left projecting portion 130 is a portion projecting toward the second connection end of the insert boom 2 beyond the first connection plate 15, that is, projecting to the distal-end side. Similarly, the first right side plate 14 has a first right projecting portion 140. The first right projecting portion 140 is a portion projecting toward the second connection end of the insert boom 2 beyond the first connection plate 15, that is, projecting to the distal-end side. Hereinafter, the first left projecting portion 130 and the first right projecting portion 140 are collectively referred to as first left and right projecting portions 130 and 140.

The first left and right projecting portions 130 and 140 are formed with a left notch 131 and a right notch 141 at respective edges of the first left and right projecting portions 130 and 140, respectively. The first left and right projecting portions 130 and 140 are further formed with respective connection pin insertion holes 133 and 143 that penetrate the first left and right projecting portions 130 and 140 in the left-right directions, respectively. Through each of the connection pin insertion holes 133 and 143 can be inserted in the left-right direction a not-graphically-shown connection pin for interconnecting the main boom 1 and the insert boom 2.

As shown in FIG. 1 and FIG. 2, the insert boom 2 includes a second upper plate 21 and a second lower plate 22 which are arranged up and down, and a second left side plate 23 and a second right side plate 24 which are arranged left and right.

The second upper plate 21 and the second lower plate 22 are arranged at positions spaced vertically. The second left side plate 23 interconnects the left end of the second upper plate 21 and the left end of the second lower plate 22 vertically. Specifically, the second left side plate 23 has an upper end joined to the left end of the second upper plate 21 and a lower end joined to the left end of the second lower plate 22. The second right side plate 24 interconnects the right end of the second upper plate 21 and the right end of the second lower plate 22 vertically. Specifically, the second right side plate 24 has an upper end joined to the right end of the second upper plate 21 and a lower end joined to the right end of the second lower plate 22. Hereinafter, the second left side platf the second right side plate 24 are also referred to as second left and right side plates 23 and 24. The second left and right side plates 23 and 24 are arranged substantially parallel to each other.

Figure 4:
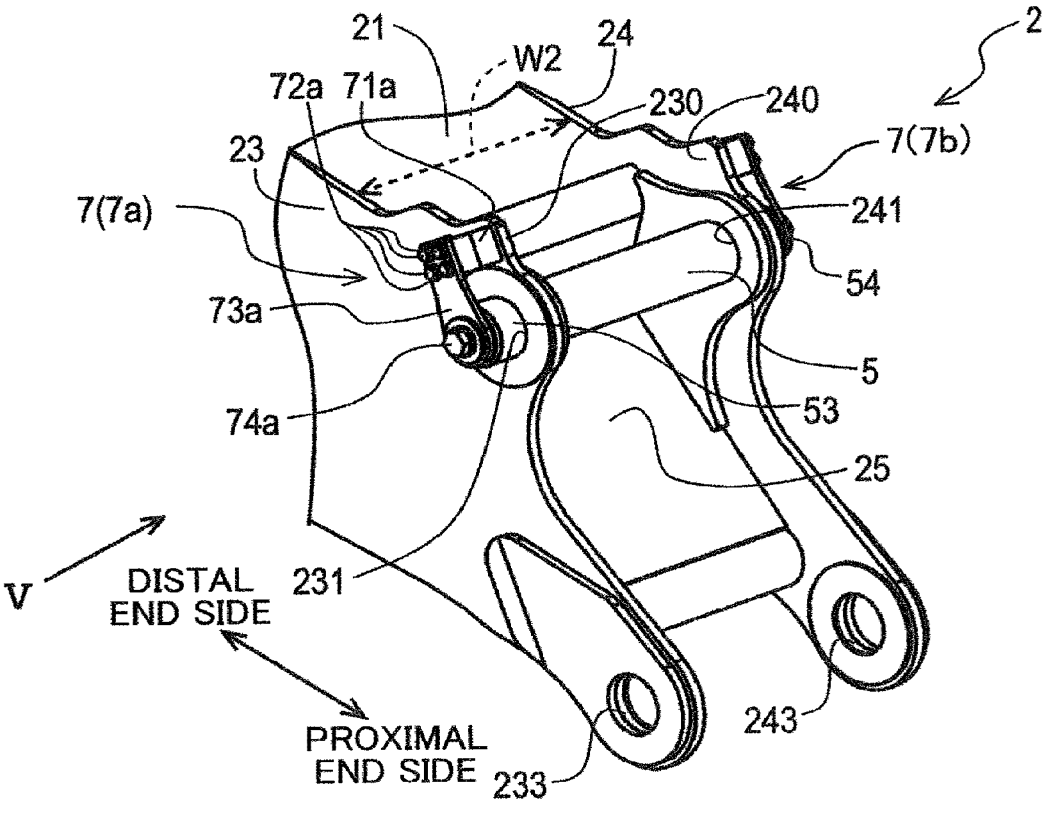
FIG. 4 is a perspective view showing a portion including a second connection end in the insert boom.
Figure 5:
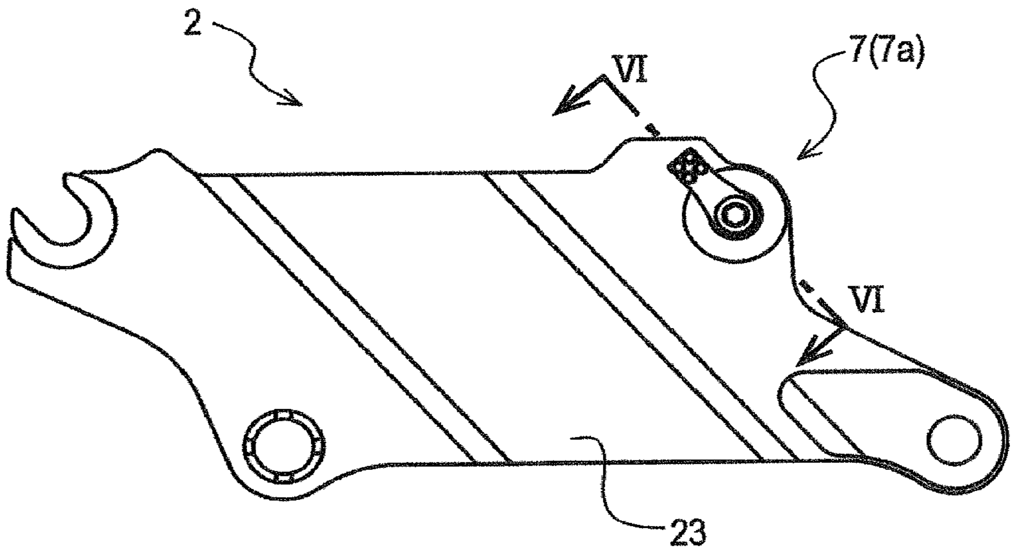
FIG. 5 is a side view showing the insert boom viewed in the direction of the arrow V in FIG. 4.
Figure 6:
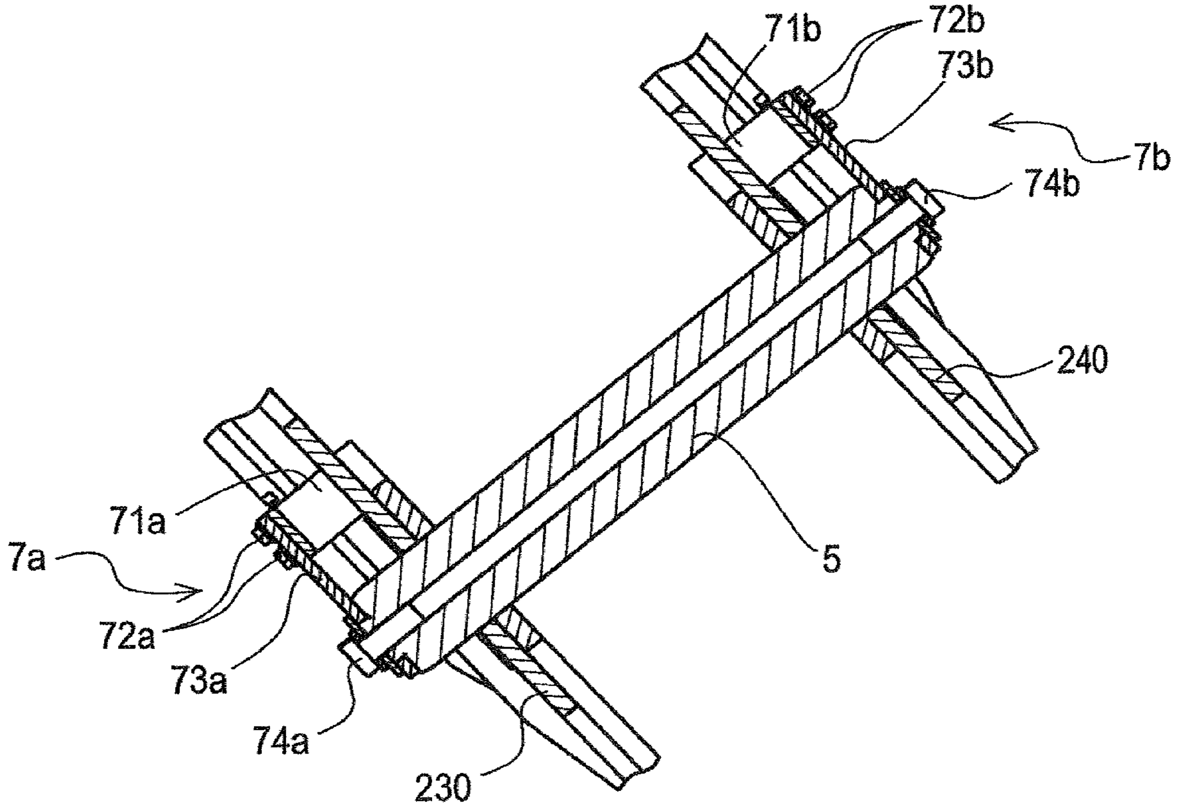
FIG. 6 is a diagram showing a cross section along VI-VI line of FIG. 5.

The interval W2 between the second left and right side plates 23 and 24 in the left-right direction as shown in FIG. 4 is smaller than the interval W1 between the first left and right side plates 13 and 14 in the left-right direction as shown in FIG. 3. Thus, the main boom 1 has a larger width than the width of the insert boom 2.

The insert boom 2 further includes a second connection plate 25 shown in FIG. 4. The second connection plate 25 is included in the second connection end of the insert boom 2. The second connection end is, as described above, a proximal end connected to the first connection end of the main boom 1, the proximal end being one of opposite ends of the insert boom 2 in the longitudinal direction, i.e., the connection direction. In the second connection end, the second connection plate 25 interconnects the second left side plate 23 and the second right side plate 24 in the left-right direction (width direction). Preferably, the second connection plate 25 further interconnects the second upper plate 21 and the second lower plate 22 vertically.

The second left side plate 23 has a second left projecting portion 230. The second left projecting portion 230 is a portion projecting toward the first connection end of the main boom 1 beyond the second connection plate 25, that is, the portion projecting to the proximal side. The second right side plate 24 has a second right projecting portion 240. The second right projecting portion 240 is a portion projecting toward the first connection end of the main boom I beyond the second connection plate 25, that is, the portion projecting to the proximal side. Hereinafter, the second left projecting portion 230 and the second right projecting portion 240 are collectively referred to as second left and right projecting portions 230 and 240.

The insert boom 2 further includes a fitting pin 5 extending in the left-right direction. The second left and right projecting portions 230 and 240 have respective upper portions, which are formed with respective fitting pin insertion holes 231 and 241 penetrating the second left and right projecting portions 230 and 240 in the left-right directions, respectively. The fitting pin 5 is inserted through the fitting pin insertion holes 231 and 241 in the left-right direction, thereby being supported by the second left and right projecting portions 230 and 240. Besides, the second left and right projecting portions 230 and 240 have respective lower portions, which arc formed with respective connection pin insertion holes 233 and 243 penetrating the second left and right projecting portions 230 and 240 in the left-right directions, respectively. The connection pin insertion holes 233 and 243 allow the connection pin for interconnecting the main boom 1 and the insert boom 2 to be inserted through the connection pin insertion holes 233 and 243 in the left-right direction.

The insert boom 2 further includes a pin holding unit 7. The pin holding unit 7 holds the fitting pin 5 so as to fix the axial position of the fitting pin 5 that is being inserted through the fitting pin insertion holes 231 and 241 (i.e., the position in the left-right direction of the insert boom 2). Specifically, the pin holding unit 7 holds the fitting pin 5 at a position where the left end of the fitting pin 5 forms a left protruding portion 53 protruding to the outside (left side) of the second left projecting portion 230, and the right end of the fitting pin 5 forms a right protruding portion 54 protruding to the outside (right side) of the second right projecting portion 240.

The pin holding unit 7 includes a left holding portion 7*a* and a right holding portion 7*b*. The left holding portion 7*a* includes a left bracket 71*a* attached to the second left side plate 23, and a left plate 73*a* fixed to the left bracket 71*a*. Similarly, the right holding portion 7*b* includes a right bracket 71*b* attached to the second right side plate 24 and a right plate 73*b* fixed to the right bracket 71*b*.

The left bracket 71*a* is fixed to the outer surface of the second left projecting portion 230, i.e., the surface facing outward (leftward) in the left-right direction. Similarly, the right bracket 71*b* is fixed to the outer surface of the second right projecting portion 240, i.e., the surface facing outward (rightward) in the left-right direction.

The left plate 73*a* has a proximal end and a distal end opposite thereto. The proximal end of the left plate 73*a* is fastened to the left bracket 71*a* through a plurality (e.g., four) of bolts 72*a* as shown in FIG. 4, thereby being attached to the second left projecting portion 230 through the left bracket 71*a*. The distal end of the left plate 73*a* is fastened to the fitting pin 5 by a bolt 74*a* while making contact with the left end of the fitting pin 5. The bolt 74*a* is screwed into the fitting pin 5 axially of the fitting pin 5.

The right plate 73*b* has a proximal end and a distal end opposite thereto. The proximal end of the right plate 73*b* is fastened to the right bracket 71*b* through a plurality of (e.g., four) bolts 72*b,* thereby being attached to the second right projecting portion 240 through the right bracket 71*b*. The distal end of the right plate 73*b* is fastened to the fitting pin 5 by a bolt 74*b* while making contact with the right end of the fitting pin 5. The bolt 74*b* is screwed into the fitting pin 5 axially of the fitting pill 5.

Figure 7:
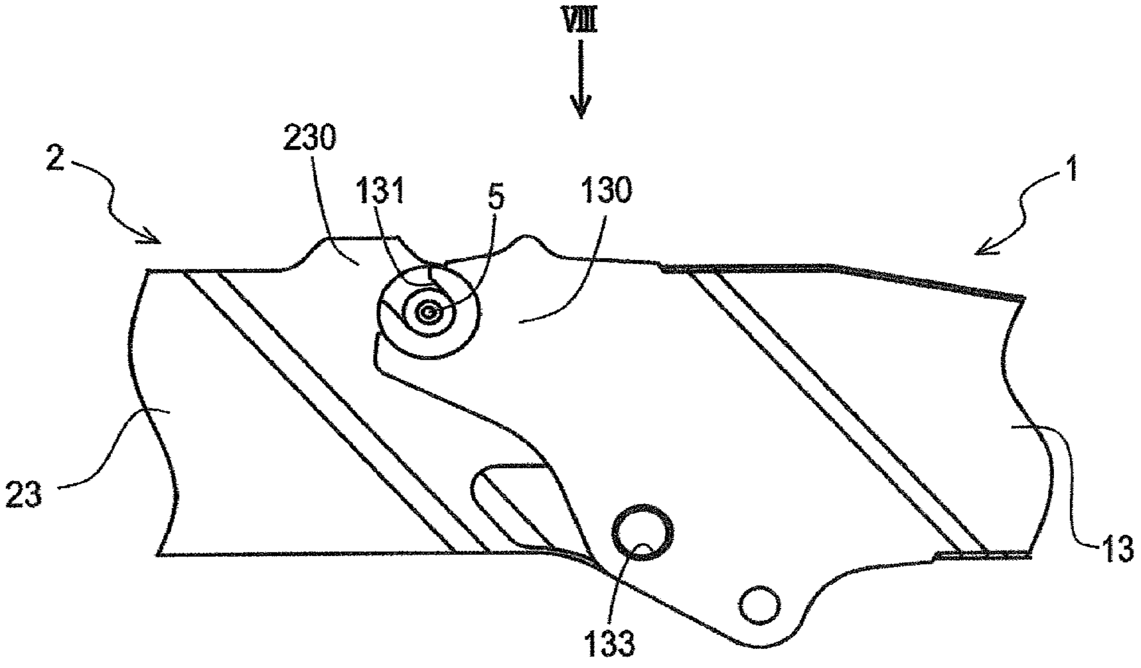
FIG. 7 is a side view showing the main boom and the insert boom connected to each other.
Figure 8:
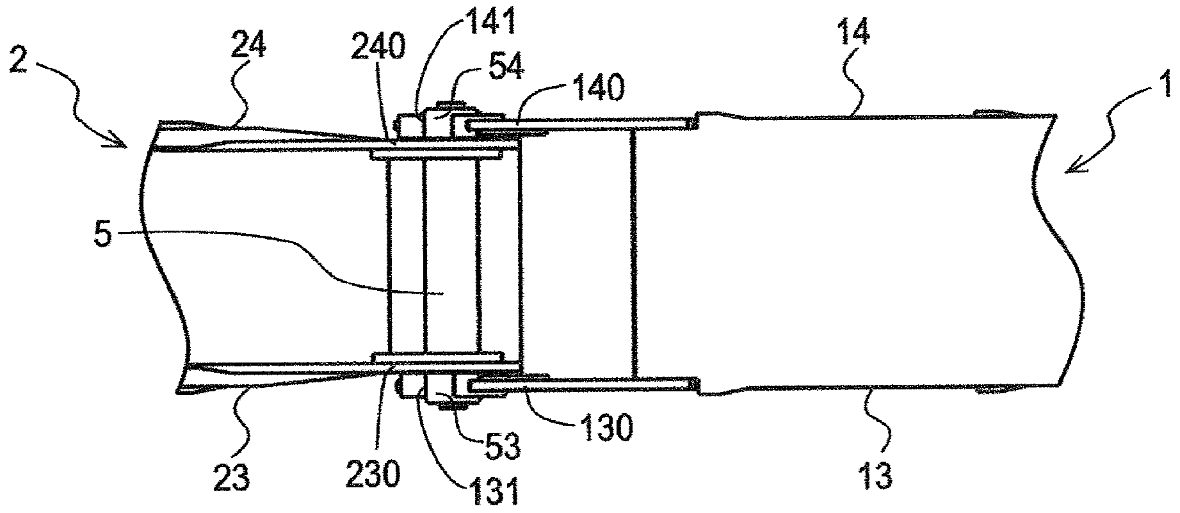
FIG. 8 is a plan view of the main boom and the insert boom viewed in the direction of the arrow VIII in FIG. 7.

As shown in FIGS. 7 and 8, the main boom 1 and the insert boom 2 are configured to be connected to each other in the connection direction in a state where the first left and right projecting portions 130 and 140 of the main boom 1 are disposed on both outer sides of the second left and right projecting portions 230 and 240 of the insert boom 2.

The fitting pin 5 can be fitted with the left notch 131 and the right notch 141. Specifically, in the fitting pin 5, the left protruding portion 53 protruding outward (leftward) beyond the second left projecting portion 230 is fitted with the left notch 131, and the right protruding portion 54 protruding outward (rightward) beyond the second right projecting portion 240 is fitted with the right notch 141. The left notch 131 has a shape opened so as to receive the left protruding portion 53 radially of the fitting pin 5, that is, so as to allow the left protruding portion 53 to be fitted with the left notch 131 radially. The right notch 141 has a shape opened so as to receive the right protruding portion 54 radially of the fitting pin 5, that is, so as to allow the right protruding portion 54 to be fitted into the right notch 141 radially.

In a state where the left and right protruding portions 53 and 54 of the fitting pin 5 are fitted with the left and right notches 131 and 141, respectively, the connection pin insertion holes 133 and 143 of the main boom 1 (see FIG. 3) and the connection pin insertion hole 233,243 of the insert boom 2 (see FIG. 4) can be aligned and a not-graphically-shown connection pin can be inserted through the connection pin insertion holes. The main boom 1 and the insert boom 2 are thereby connected to each other.

As described above, the fitting of the left and right protruding portions 53 and 54 of the fitting pin 5 with the left and right notches 131 and 141 enables the main boom 1 and the insert boom 2 to be roughly aligned for connecting. The rough alignment facilitates the alignment of the connection pin insertion holes 133 and 143 of the main boom 1 and the connection pin insertion holes 233 and 243 of the insert boom 2 for insertion of the not-graphically-shown connection pin.

Furthermore, the structure according to the first embodiment allows the fitting pin 5 and the notches 131 and 141 to be quickly fitted with each other, thereby allowing the main boom 1 and the insert boom 2 to be quickly connected to each other. Specifically, in a state where the first left and right projecting portions 130 and 140 of the main boom 1 are disposed on both outer sides of the second left and right projecting portions 230 and 240 of the insert boom 2, the left protruding portion 53 protruding outward (leftward) from the second left projecting portion 230 and the right protruding portion 54 protruding outward (rightward) from the second right projecting portion 240 of the fitting pin 5 are fitted with the left notch 131 and the right notch 141, respectively, which fitting allows an operator to perform work while visually recognizing the fitting state of the fitting pin 5 and the left and right notches 131 and 141 from the side. This makes it possible to fit the fitting pin 45 with the left and right notches 131, 141 easily, thus making it possible to interconnect the main boom 1 and the insert boom 2, the components of the attachment, quickly and easily.

Besides, the interval W1 between the first left and right side plates 13 and 14 of the main boom 1 in the left-right direction (see FIG. 3), which is greater than the interval W2 between the second left and right side plates 23 and 24 of the insert boom 2 in the left-right direction (see FIG. 4), allows the insert boom 2 disposed on the distal end side to be relatively lighter and allows the main boom 1 disposed on the proximal end side to be relatively heavy. This allows the attachment to be lifted more safely with the center of gravity of the entire attachment close to the machine body.

The pin holding unit 7 can fix the axial position of the fitting pin 5 with a simple configuration including left and right holding portions 7*a* and 7*b* disposed left and right sides, the left and right holding portions 7*a* and 7*b* including the left and right plates 73*a* and 73*b* and the left and right brackets 71*a* and 71*b*, respectively.

Next will be described an attachment of the work machine according to the second embodiment of the present invention with reference to FIGS. 9 and 10.

The attachment according to the second embodiment includes the main boom 1 and the insert boom 2 in the same manner as the first embodiment, but the insert boom 2 includes a left auxiliary projecting plate 330 and a right auxiliary projecting plate 340 in addition to the components of the insert boom 2 according to the first embodiment. The left and right auxiliary projecting plates 330 and 340 are formed with left and right auxiliary notches 331 and 341 similar to the left and right notches 131 and 141, respectively, and the four notches 131, 141, 331 and 341 in total are fitted with the common fitting pin 5 similarly to the first embodiment.

Figure 9:
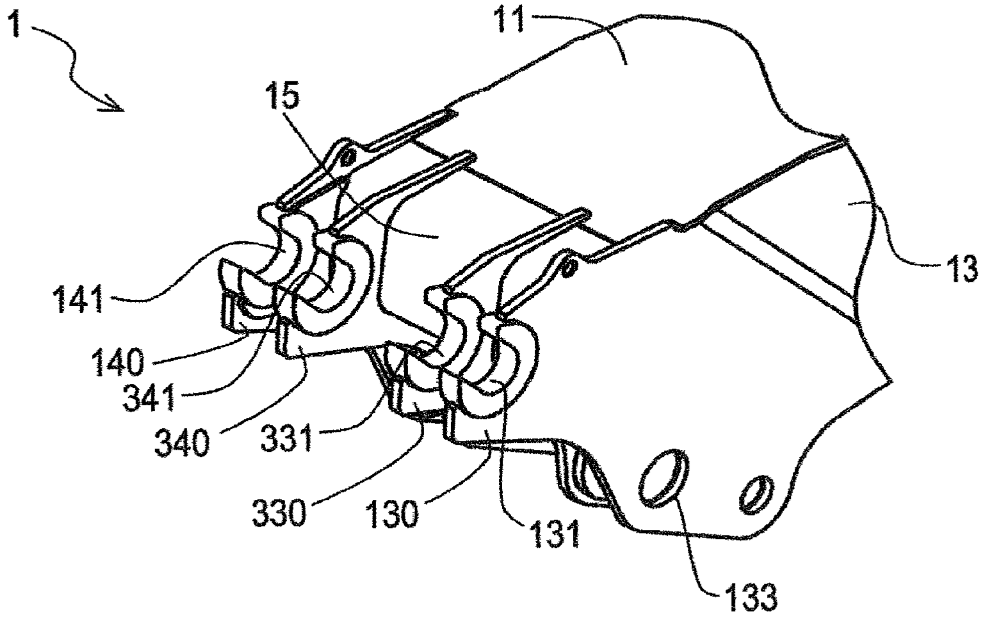
FIG. 9 is a perspective view showing a part including a first connection end of the main boom constituting the attachment of the working machine according to a second embodiment of the present invention.

As shown in FIG. 9, the left and right auxiliary projecting plates 330 and 340 are fixed to the first connection plate 15 of the main boom 1 so as to project from the first connection plate 15 toward the second connection end of the insert boom 2. The left and right auxiliary projecting plates 330 and 340 are disposed on the inner side of the first left and right projecting portions 130 and 140 in a posture substantially parallel to the first left and right projecting portions 130 and 140.

The left and right auxiliary notches 331 and 341 are formed in the left and right auxiliary projecting plates 330 and 340, respectively, so as to have respective shapes capable of being fitted to the body portion of the fitting pin 5.

Figure 10:
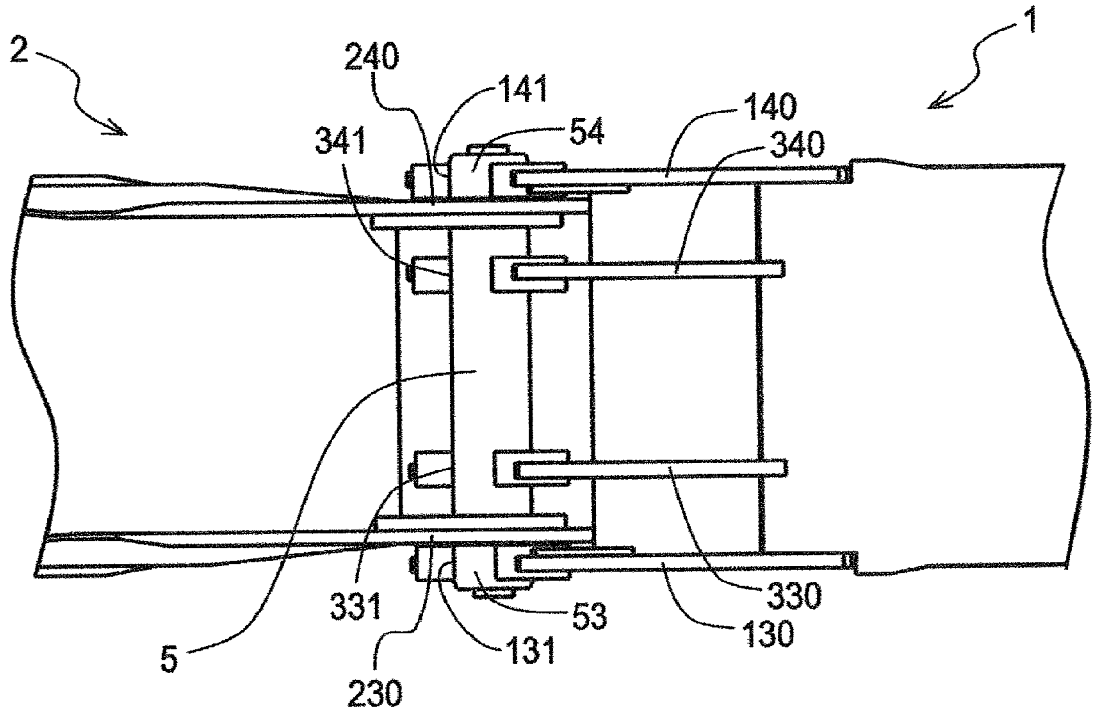
FIG. 10 is a plan view showing the main boom and the insert boom connected to each other in the second embodiment.

As shown in FIG. 10, for connection of the main boom 1 and the insert boom 2 to each other, the first left and right projecting portions 130 and 140 of the main boom 1 are disposed on respective outer sides of the second left and right projecting portions 230 and 240 of the insert boom 2, respectively, similarly to the first embodiment, and the left and right auxiliary projecting plates 330 and 340 are disposed on respective inner sides of the second left and right projecting portions 230 and 240 of the insert boom 2. In other words, the main boom 1 and the insert boom 2 are connected to each other in a state where the first left and right projecting portions 130 and 140 are disposed on the outer sides of the second left and right projecting portions 230 and 240, and the left and right auxiliary projecting plates 330 and 340 are disposed on the inner sides of the second left and right projecting portions 230 and 240.

Similarly to the first embodiment, in the fitting pin 5, the left protruding portion 53 protruding outward (leftward) beyond the second left projecting portion 230 is fitted with the left notch 131 of the first left projecting portion 130, and the right protruding portion 54 protruding outward (rightward) beyond the second right projecting portion 240 is fitted with the right notch 141 of the first right projecting portion 140. In addition, the left and right parts of the fitting pin 5 that are located on respective inner sides of the second left and right projecting portions 230 and 240 are fitted with the left and right auxiliary notches 331 and 341 formed in the left and right auxiliary projecting plates 330 and 340, respectively. This enables the body portion of the fitting pin 5 to be supported not only by the first left and right projecting portions 130, 140 but also by the left and right auxiliary projecting plates 330, 340, as shown in FIG. 10. This allows the bending moment acting on the fitting pin 5 to be reduced as compared with the first embodiment in which the body portion of the fitting pin 5 is fitted only in the left and right notches 131 and 141 to be supported only by the first left and right projecting portions 130 and 140. As a result, the strength required for the fitting pin 5 can be low. This allows the fitting pin 5 to he given a small diameter and reduced in weight, and allows the fitting pin 5 to be made of inexpensive material.

The attachment of a work machine according to the present invention is not limited to the above-described embodiment, being allowed to be variously modified and improved within the scope of the claims.

Figure 11:
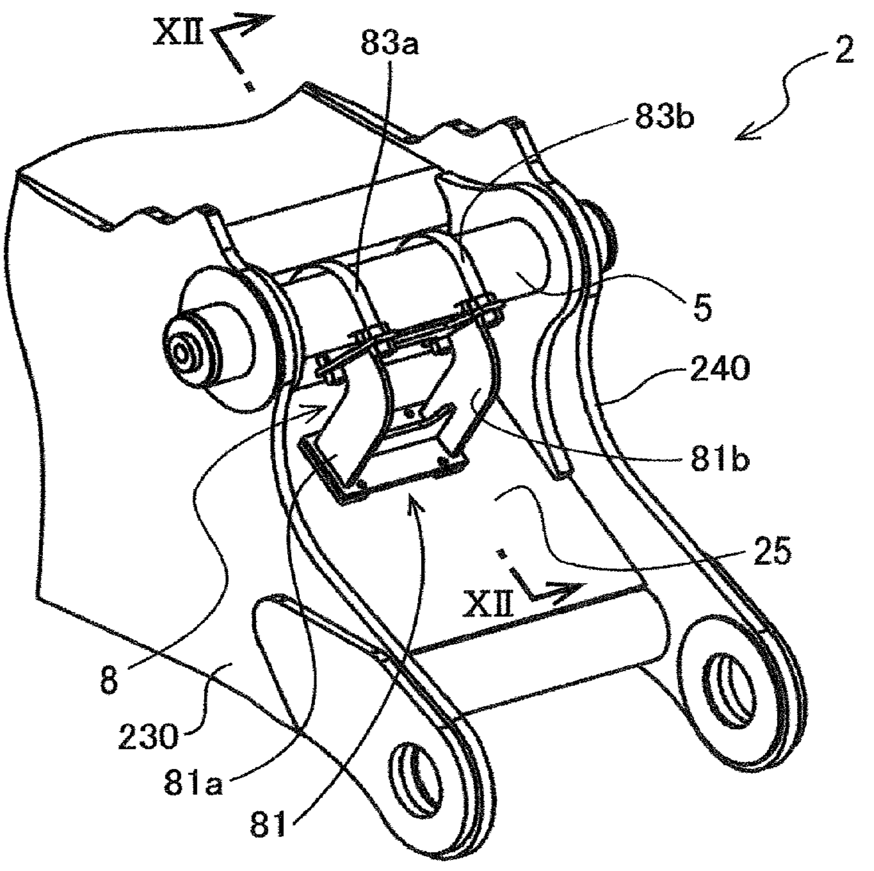
FIG. 11 is a perspective view showing a part of the insert boom constituting the attachment of the work machine according to a third embodiment of the present invention, the part including a pin holding unit.
Figure 12:
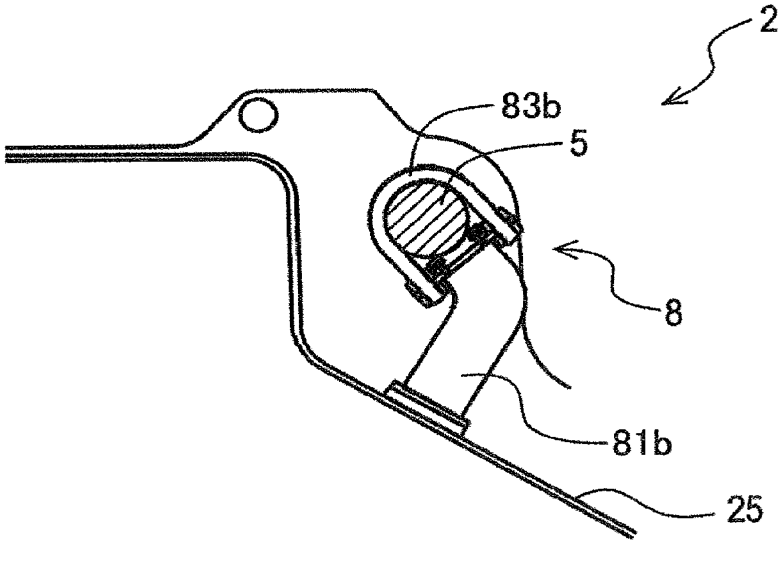
FIG. 12 is a diagram showing a cross section along XII-XII line of FIG. 11.

FIGS. 11 and 12 show a second connection end of an insert boom 2 according to a first modification. The second connection end includes a pin holding unit 8 shown in FIGS. 11 and 12, instead of the pin holding unit 7 shown in FIGS. 4 to 6.

The pin holding unit 8 includes a bracket 81 which is fixed to a second connection plate 25 of the insert boom 2, and a left locking member 83*a* and a right locking member 83*b* which are supported by the bracket 81.

The bracket 81 includes a left vertical plate 81*a* and a right vertical plate 81*b*. Each of the left and right vertical plates 81*a* and 81*b* has a shape extending obliquely upward from the second connection plate 25 and bending to the side opposite to the main boom 1 in the middle portion thereof.

The left and right locking members 83*a* and 83*b* are attached to the left and right vertical plates 81*a* and 81*b* while engaging with the fitting pin 5, thereby restraining the fitting pin 5. The body portion of the fitting pin 5 has an outer peripheral surface formed with left and right grooves extending circumferentially thereof. Each of the left and right locking members 83*a* and 83*b* is substantially U-shaped. Specifically, each of the left and right locking members 83*a* and 83*b* has an intermediate portion curved with a radius of curvature equivalent to the radius of curvature of the left and right groove portions, and opposite ends on both sides of the intermediate portion. The left and right locking members 83*a* and 83*h*, in which the opposite ends are fixed to the left and right vertical plates 81*a* and 81*b*, respectively, while the intermediate portions are fitted to the left and right groove portions, prevent the fitting pin 5 from axial movement.

Figure 13:
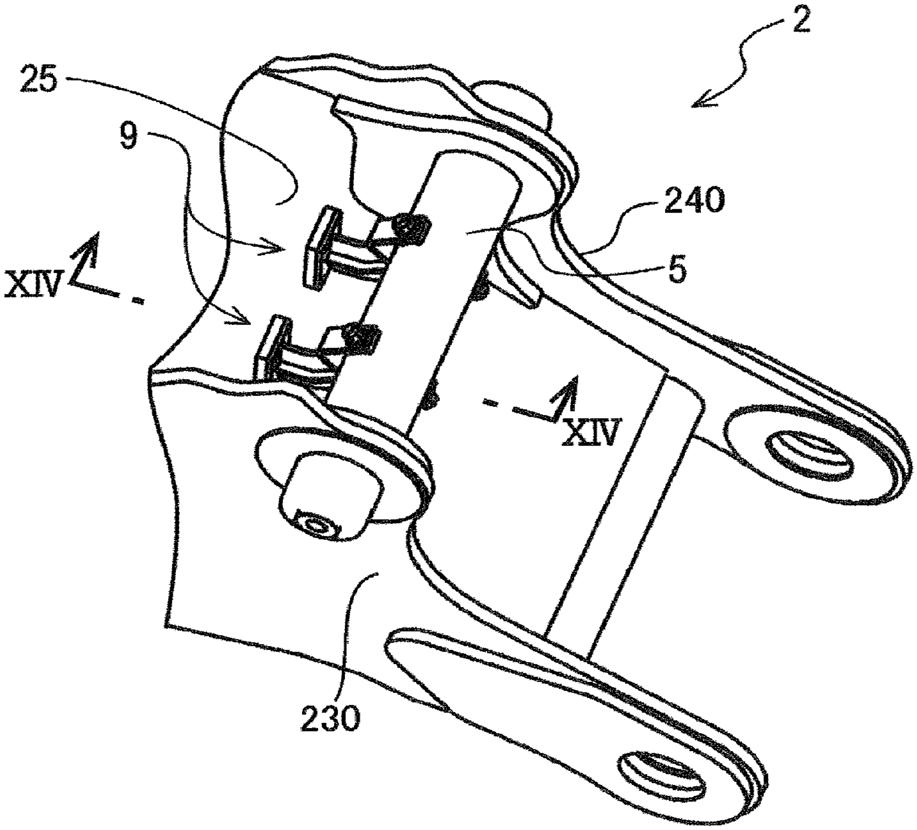
FIG. 13 is a perspective view showing a part of the insert boom constituting the attachment of the working machine according to the first modification, the part including a pin holding unit.
Figure 14:
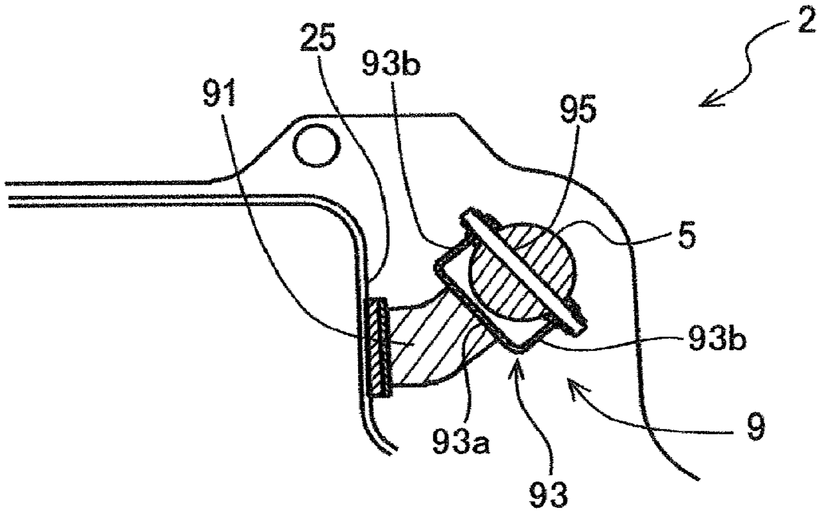
FIG. 14 is a diagram showing a cross section along XIV-XIV line of FIG. 13.

FIGS. 13 and 14 show a second connection end of an insert boom 2 according to a second modification. The second connection end includes a pair of left and right pin holding units 9 shown in FIGS. 13 and 14 instead of the pin holding unit 7 shown in FIGS. 4 to 6.

Each of the pair of pin holding units 9 includes a bracket 91, a holding member 93 and a retaining pin 95, which are shown in FIG. 14.

The bracket 91 is erected on the second connection plate 25 of the insert boom 2, having a shape projecting from the second connection plate 25 toward the fitting pin 5 and bending upward in the middle.

The holding member 93 has a shape for holding the fitting pin 5 while being fixed to the distal end of the bracket 91. Specifically, the holding member 93 has a base portion 93*a* fixed to and supported by the bracket 91, and a pair of holding portions 93*b* protruding from opposite ends of the base portion 93*a* to the side opposite to the bracket 91. The pair of holding portions 93*h* have respective inner surfaces opposed to each other, and hold the fitting pin 5 between the inner surfaces. Each of the pair of holding portions 93*b* is formed with a retaining pin insertion hole penetrating therethrough.

The retaining pin 95 is held by the pair of holding portions 93*b* while penetrating the fitting pin 5 in the diameter direction, thereby preventing the fitting pin 5 from axial movement. There are formed through holes that penetrate the fitting pin 5 in the diameter direction in respective parts of the fitting pin 5, the parts being to be held by the pair of pin holding units, respectively. The retaining pin 95 can be fixed to the pair of holding portions 93*b* through a bolt or the like while being inserted through the through hole and the retaining pin insertion hole.

The number of the pin holding units 9 is not limited. For example, the insert boom 2 may have a single pin holding unit 9, or may include three or more pin holding units 9 arranged in the left-right direction.

Figure 15:
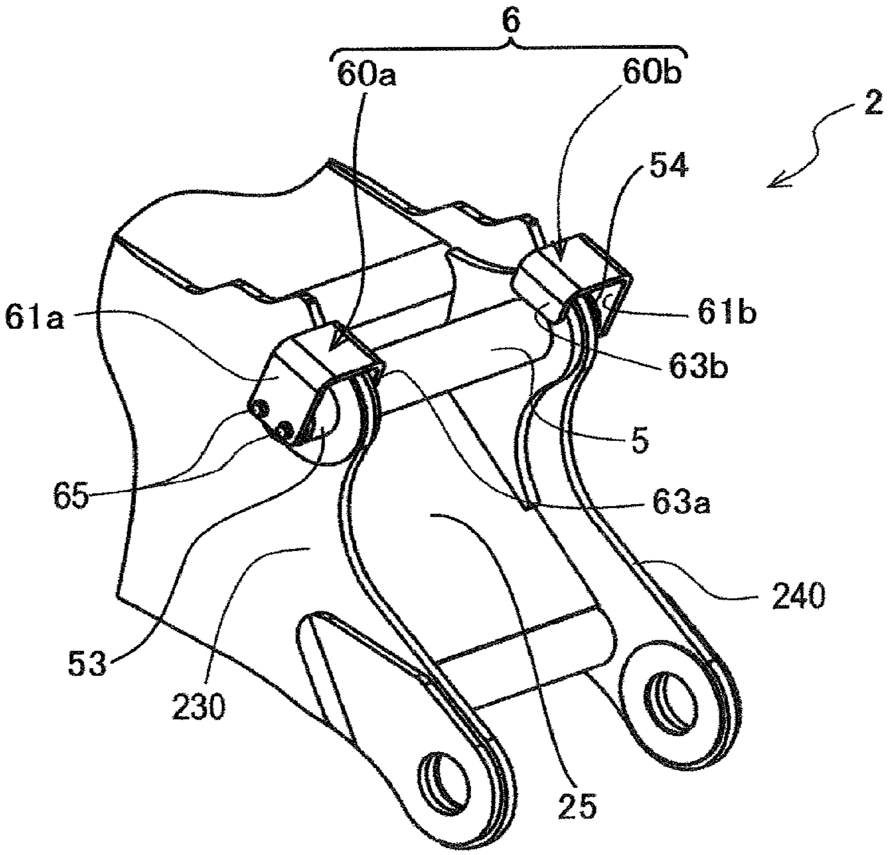
FIG. 15 is a perspective view showing a part of the insert boom constituting the attachment of the working machine according to the second modification, the part including a pin holding unit.

FIG. 15 shows a second connection end of an insert boom 2 according to a third modification. The second connection end includes a pin holding unit 6 shown in FIG. 15 instead of the pin holding unit 7 shown in FIGS. 4 to 6. The pin holding unit 6 holds the fitting pin 5 so as to restrain the left and right ends of the fitting pin 5 by the second left and right projecting portions 230 and 240 of the insert boom 2, respectively.

Specifically, the pin holding unit 6 includes a left restraining plate 60*a* and a right restraining plate 60*b* shown in FIG. 15. The left restraining plate 60*a* has a U shape straddling a left protruding portion 53 of the fitting pin 5 and a second left projecting portion 230, and the right restraining plate 60*b* has a U shape straddling a right protruding portion 54 of the fitting pin 5 and a second right projecting portion 240. More specifically, the left restraining plate 60*a* includes a left outer plate portion 61*a* located on the outer side of the left end surface of the fitting pin 5 and a left inner plate portion 63*a* located on the inner side of the second left projecting portion 230, and the right restraining plate 60*b* includes a right outer plate portion 61*b* located on the outer side of the right end surface of the fitting pin 5 and an outer plate portion 63*b* located on the inner side of the second right projecting portion 240. The left and right outer plate portions 61*a* and 61*b* are fastened to the fitting pin 5 through bolts 65 while making respective contacts with the left and right end faces of the fitting pin 5. On the other hand, the left and right inner plate portions 63*a* and 63*b* are disposed at respective positions close to the inner surfaces of the second left and right projecting portions 230 and 240, respectively. The left and right restraining plates 60*a* and 60*b* can prevent the fitting pin 5 from axial movement with respective contacts of the inner plate portions 63*a* and 63*b* thereof with respective inner surfaces of the left and right projecting portions 230 and 240. Thus using the left and right holding sections 6A and 6B eliminates the need for securing special brackets or the like to the insert boom 2, allowing the total number of components to be reduced.

The first attachment body and the second attachment body according to the present invention are not limited to the main boom 1 and the insert boom 2 according to the above-described embodiment, respectively. For example, the first attachment body and the second attachment body may be two arms connected to each other, or may be a boom and an arm connected to each other.

As described above, there is provided an attachment for a work machine, the attachment including a first attachment body and a second attachment body that can be detachably coupled to each other and allowing the first and second attachment bodies to be coupled to each other quickly and easily.

Provided is an attachment for a work machine, comprising a first attachment body having a first connection end and a second attachment body having a second connection end connectable to the first connection end. The first attachment body includes a first left side plate and a first right side plate arranged left and right, and a first connection plate interconnecting the first left side plate and the first right side plate in the first connection end. The first left side plate has a first left projecting portion that projects beyond the first connection plate toward the second connection end, and the first right side plate has a second right projecting portion that projects beyond the first connection plate toward the second connection end. The second attachment body includes a pair of a second right side plate and a second right side plate, a second connection plate interconnecting the second left side plate and the second right side plate in the second connection end, and a fitting pin extending in a left-right direction. The second left side plate has a second left projecting portion that projects beyond the second connection plate toward the first connection end, and the second right side plate has a second right projecting portion that projects beyond the second connection plate toward the first connection end. The second left projecting portion is formed with a left fitting pin insertion hole penetrating the second left projecting portion in the left-right direction, and the second right projecting portion is formed with a right fitting pin insertion hole penetrating the second right projecting portion in the left-right direction. The fitting pin is inserted through the left insertion hole and the right insertion hole so as to have a left protruding portion protruding to the left outside of the first left projecting portion and a right protruding portion protruding to the right outside of the first right projecting portion. The first left projecting portion is formed with a left notch having a shape opened so as to be able to receive the left protruding portion of the fitting pin radially of the fitting pin, and the first right projecting portion is formed with a right notch having a shape opened so as to be able to receive the right protruding portion of the fitting pin radially of the fitting pin. The interval between the first right side plate and the first left side plate in the left-right direction is greater than the interval between the second right side plate and the second left side plate in the left-right direction. The first attachment body and the second attachment body are configured to he connected to each other in a state where the first left projecting portion and the second right projecting portion are disposed on both outer sides of the second left projecting portion and the second right projecting portion in the left-right direction, and the left projecting portion and the right protruding portion of the fitting pin are configured to be fitted with the left notch and the right notch, respectively, in respective positions on both outer sides of the second left projecting portion and the second right projecting portion in the left-right direction.

This attachment, in which the fitting state of the left and right projecting portions of the fitting pin and the left and right notches can be visually recognized from the side, allows the fitting pin and the left and right notches to be easily fitted to each other. This makes it possible to connect the first and second attachment bodies to each other quickly and easily.

Preferably, the first attachment body and the second attachment body are configured to be connected to each other in a state where the first attachment body is disposed on a proximal end side and the second attachment body is disposed on a distal end side.

This attachment, where the first attachment body disposed on the proximal end side can have a width larger than that of the second attachment body disposed on the distal end side, allows the center of gravity of the entire attachment to be close to the machine body, thereby enabling the attachment to be lifted more safely.

It is preferable that: the first attachment body further includes a left auxiliary projecting plate and a right auxiliary projecting plate that project from the first connection plate toward the second connection end of the second attachment body substantially parallel to the first left and right projecting portions on respective inner sides of the first left projecting portion and the first right projecting portion in the left-right directions; the left auxiliary projecting plate and the right auxiliary projecting plate are formed with a left auxiliary notch and a right auxiliary notch, respectively, each having a shape capable of receiving the fitting pin radially of the fitting pin; the first attachment body and the second attachment body are configured to be connected to each other in a state where the first left projecting portion and the first right projecting portion are disposed on both outer sides of the second left projecting portion and the right projecting portion in the left-right directions and the left auxiliary projecting plate and the right auxiliary projecting plate are disposed on respective inner sides of the second left projecting portion and the right projecting portions in the left-right directions, and configured such that the left projecting portion and the right protruding portion of the fitting pin are fitted to the left notch and the right notch and respective inner portions of the fitting pin on respective inner sides of the second left projecting portion and the second right projecting portion in the left-right direction are fitted to the left auxiliary notch and the right auxiliary notch, respectively.

According to this attachment, the fitting pin can be supported not only by the first left and right projecting portions formed with the left and right notches but also by the left and right auxiliary projecting plates formed with the left and right auxiliary notches. This allows the bending moment generated in the fitting pin to be reduced as compared with the case where the fitting pin is supported only by the first left and right projecting portions. As a result, the strength required for the fitting pin is reduced. This allows the fitting pin to be given a small diameter to be lighter and allows the fitting pin to be made of an inexpensive material.

Preferably, the second attachment body further includes a pin holding unit that holds the fitting pin so as to fix the position of the fitting pin in the left-right direction, the fitting pin being inserted through the fitting pin insertion hole.

The pin holding unit according to this embodiment can fix the position, in the left-right direction, of the pin hold unit inserted through the fitting pin insertion hole to be thereby supported with sufficient strength by the second left and right projecting portions.

The pin holding unit preferably includes left and right plates fastened to the fitting pin axially of the fitting pin while making contact with the left and right ends of the fitting pin, respectively, and left and right brackets fixed to respective outer surfaces of the second left and right projecting portions to support the left and right plates, respectively.

The pin holding unit can fix the position of the fitting pin in the left-right direction with a simple configuration including the left and right plates and the left and right brackets.

Alternatively, the pin holding unit preferably holds the fitting pin so as to restrain the left end and the right end of the fitting pin to the second left projecting portion and the second right projecting portion, respectively.

Specifically, it is preferable that the pin holding unit has a left restraining plate having a shape straddling the left protruding portion and the second left projecting portion, and a right restraining plate having a shape straddling the right protruding portion and the second right projecting portion; the left restraining plate has a left outer plate portion that is fastened to the left end surface of the fitting pin in a state of being located on an outer side of the left end surface and making contact with the left end surface, and a left inner plate portion that is in proximity to the inner surface of the second left projecting portion; and the right restraining plate has a right outer plate portion that is fastened to the right end surface in a state of being located on an outer side of the right end surface of the fitting pin and making contact with the right end surface, and a right inner plate portion that is in proximity to the inner surface of the second right projecting portion.

The use of the left holding portion and the right holding portion eliminates the need for a bracket or the like to be fixed to the second attachment body to allow the number of parts to be reduced.

The invention claimed is:

1. An attachment of a work machine, the attachment comprising:

a first attachment body having a first connection end; and a second attachment body having a second connection end connectable to the first connection end, wherein:

the first attachment body includes a first left side plate and a first right side plate that are disposed left and right, and a first connection plate interconnecting the first left side plate and the first right side plate in the first connection end;

the first left side plate includes a first left projecting portion that projects beyond the first connection plate toward the second connection end, and the first right side plate includes a first right projecting portion that projects beyond the first connection plate toward the second connection end;

the second attachment body includes a second left side plate and a second right side plate that are disposed left and right, a second connection plate interconnecting the second left side plate and the second right side plate in the second connection end, and a fitting pin extending in a left-right direction;

the second left side plate includes a second left projecting portion that projects beyond the second connection plate toward the first connection end, and the second right side plate includes a second right projecting portion that projects beyond the second connection plate toward the first connection end;

the second left projecting portion is formed with a left fitting pin insertion hole penetrating the second left projecting portion in the left-right direction, and the second right projecting portion is formed with a right fitting pin insertion hole penetrating the second right projecting portion in the left-right direction;

the fitting pin is inserted through the left fitting pin insertion hole and the right fitting pin insertion hole so as to have a left protruding portion protruding to the left outside of the first left projecting portion and a right protruding portion protruding to the right outside of the first right projecting portion;

the first left projecting portion is formed with a left notch having a shape opened so as to be able to receive the left protruding portion of the fitting pin radially of the fitting pin, and the first right projecting portion is formed with a right notch having a shape opened so as to be able to receive the right protruding portion of the fitting pin radially of the fitting pin;

an interval between the first left side plate and the first right side plate in the left-right direction is larger than an interval between the second left side plate and the second right side plate in the left-right direction;

the first attachment body and the second attachment body are configured to be connected to each other in a state where the first left projecting portion and the first right projecting portion are disposed on both outer sides of the second left projecting portion and the second right projecting portion in the left-right direction, respectively; the left protruding portion and the right protruding portion of the fitting pin are configured to be fitted with the left notch and the right notch, respectively, at respective positions on both outer sides of the second left projecting portion and the second right projecting portion in the left-right direction;

the first attachment body further includes a left auxiliary projecting plate and a right auxiliary projecting plate that project from the first connection plate toward the second connection end substantially parallel to the first left projecting portion and the first right projecting portion on respective inner sides of the first left projecting portion and the first right projecting portion in the left-right direction;

the left auxiliary projecting plate and the right auxiliary projecting plate are formed with a left auxiliary notch and a right auxiliary notch, respectively, each having a shape capable of receiving the fitting pin radially of the fitting pin; and the first attachment body and the second attachment body are configured to be connected to each other in a state where the first left projecting portion and the first right projecting portion are disposed on both outer sides of the second left projecting portion and the second right projecting portion in the left-right direction and the left auxiliary projecting plate and the right auxiliary projecting plate are disposed on respective inner sides of the second left projecting portion and the second right projecting portion in the left-right direction, and configured such that the left projecting portion and the right protruding portion of the fitting pin are fitted with the left notch and the right notch, respectively, and respective inner portions of the fitting pin on respective inner sides of the second left projecting portion and the second right projecting portion in the left-right direction are fitted to the left auxiliary notch and the right auxiliary notch, respectively.

2. The attachment of a work machine according to claim 1, wherein the first attachment body and the second attachment body are configured to be connected to each other in a state where the first attachment body is disposed on a proximal end side and the second attachment body is disposed on a distal end side.

3. An attachment of a work machine, the attachment comprising:

a first attachment body having a first connection end; and a second attachment body having a second connection end connectable to the first connection end, wherein:

the first attachment body includes a first left side plate and a first right side plate that are disposed left and right, and a first connection plate interconnecting the first left side plate and the first right side plate in the first connection end;

the first left side plate includes a first left projecting portion that projects beyond the first connection plate toward the second connection end, and the first right side plate includes a first right projecting portion that projects beyond the first connection plate toward the second connection end;

the second attachment body includes a second left side plate and a second right side plate that are disposed left and right, a second connection plate interconnecting the second left side plate and the second right side plate in the second connection end, and a fitting pin extending in a left-right direction;

the second left side plate includes a second left projecting portion that projects beyond the second connection plate toward the first connection end, and the second right side plate includes a second right projecting portion that projects beyond the second connection plate toward the first connection end;

the second left projecting portion is formed with a left fitting pin insertion hole penetrating the second left projecting portion in the left-right direction, and the second right projecting portion is folioed with a right fitting pin insertion hole penetrating the second right projecting portion in the left-right direction;

the fitting pin is inserted through the left fitting pin insertion hole and the right fitting pin insertion hole so as to have a left protruding portion protruding to the left outside of the first left projecting portion and a right protruding portion protruding to the right outside of the first right projecting portion;

the first left projecting portion is formed with a left notch having a shape opened so as to be able to receive the left protruding portion of the fitting pin radially of the fitting pin, and the first right projecting portion is formed with a right notch having a shape opened so as to be able to receive the right protruding portion of the fitting pin radially of the fitting pin;

an interval between the first left side plate and the first right side plate in the left-right direction is larger than an interval between the second left side plate and the second right side plate in the left-right direction;

the first attachment body and the second attachment body are configured to be connected to each other in a state where the first left projecting portion and the first right projecting portion are disposed on both outer sides of the second left projecting portion and the second right projecting portion in the left-right direction, respectively;

the left protruding portion and the right protruding portion of the fitting pin are configured to be fitted with the left notch and the right notch, respectively, at respective positions on both outer sides of the second left projecting portion and the second right projecting portion in the left-right direction;

the second attachment body further includes a pin holding unit that holds the fitting pin so as to fix a position of the fitting pin in the left-right direction, the fitting pin being inserted through the fitting pin insertion hole; and the pin holding unit includes left and right plates that are fastened to the fitting pin axially of the fitting pin in a state of making contact with left and right ends of the fitting pin, respectively, and left and right brackets that are fixed to respective outer surfaces of the second left projecting portion and second right projecting portion to support the left plate and the right plate, respectively.

4. The attachment of a work machine according to claim 3, wherein the first attachment body and the second attachment body are configured to be connected to each other in a state where the first attachment body is disposed on a proximal end side and the second attachment body is disposed on a distal end side.

* * * * *